United States Patent
Waltermann et al.

(10) Patent No.: US 10,230,700 B2
(45) Date of Patent: Mar. 12, 2019

(54) TRANSACTION BASED MESSAGE SECURITY

(71) Applicant: LENOVO (Singapore) PTE. LTD., New Tech Park (SG)

(72) Inventors: Rod D. Waltermann, Rougemont, NC (US); Rodrigo Felix de Almeida, Raleigh, NC (US); Brian Alan Burdette, Apex, NC (US); Timothy Winthrop Kingsbury, Cary, NC (US); Bradley Park Strazisar, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 166 days.

(21) Appl. No.: 15/232,359

(22) Filed: Aug. 9, 2016

(65) Prior Publication Data

US 2018/0048631 A1    Feb. 15, 2018

(51) Int. Cl.
*H04L 29/06* (2006.01)
*H04W 12/02* (2009.01)
*H04W 12/04* (2009.01)

(52) U.S. Cl.
CPC .......... *H04L 63/06* (2013.01); *H04L 63/0428* (2013.01); *H04L 63/067* (2013.01); *H04L 63/068* (2013.01); *H04L 63/10* (2013.01); *H04L 63/102* (2013.01); *H04L 63/123* (2013.01); *H04L 63/1441* (2013.01); *H04W 12/02* (2013.01); *H04W 12/04* (2013.01)

(58) Field of Classification Search
CPC ..... H04L 63/06; H04L 63/10; H04L 63/0428; H04L 63/067; H04L 63/068; H04W 12/04; H04W 12/02
See application file for complete search history.

(56) References Cited

U.S. PATENT DOCUMENTS

| | | | | |
|---|---|---|---|---|
| 7,093,137 | B1* | 8/2006 | Sato | G06F 21/6227 380/277 |
| 8,856,901 | B2* | 10/2014 | Os | G06F 21/445 700/237 |
| 9,641,488 | B2* | 5/2017 | Mityagin | H04L 67/1095 |
| 9,667,608 | B2* | 5/2017 | Witherspoon | H04W 12/04 |
| 9,813,245 | B2* | 11/2017 | Le Saint | H04L 9/0841 |
| 9,818,315 | B2* | 11/2017 | Hiltunen | G09C 1/00 |
| 9,887,839 | B2* | 2/2018 | Fadaie | H04L 9/0838 |
| 2003/0226011 | A1* | 12/2003 | Kuwano | G06F 21/10 713/155 |
| 2004/0076294 | A1* | 4/2004 | Shibata | G11B 20/00086 380/201 |
| 2005/0180575 | A1* | 8/2005 | Maeda | H04L 7/0075 380/278 |

(Continued)

*Primary Examiner* — David Garcia Cervetti
(74) *Attorney, Agent, or Firm* — Kunzler, PC

(57) ABSTRACT

Apparatuses, systems, methods, and program products are disclosed for transaction based networks security. A data module determines a set of data that is common between a first device and a second device. A key module generates, on a first device, a communication key based on a set of data. A message module secures a message sent to a second device from a first device with a communication key. A second device accepts a message in response to a communication key matching a corresponding communication key generated on the second device.

20 Claims, 5 Drawing Sheets

(56) References Cited

U.S. PATENT DOCUMENTS

| | | | | |
|---|---|---|---|---|
| 2005/0273843 A1* | 12/2005 | Shigeeda | H04L 9/3213 | 726/5 |
| 2006/0021063 A1* | 1/2006 | Hori | H04L 9/0841 | 726/27 |
| 2006/0143453 A1* | 6/2006 | Imamoto | H04L 9/3273 | 713/169 |
| 2006/0190996 A1* | 8/2006 | Korkishko | G06F 21/57 | 726/9 |
| 2007/0226516 A1* | 9/2007 | Kubota | H04L 9/0866 | 713/186 |
| 2007/0230688 A1* | 10/2007 | Tajima | H04L 9/0858 | 380/30 |
| 2008/0102798 A1* | 5/2008 | Fujimoto | H04L 63/06 | 455/411 |
| 2009/0016537 A1* | 1/2009 | Ju | H04H 60/15 | 380/278 |
| 2009/0100264 A1* | 4/2009 | Futa | H04L 9/0844 | 713/170 |
| 2010/0235588 A1* | 9/2010 | Maeda | H04L 9/085 | 711/147 |
| 2011/0033052 A1* | 2/2011 | Yamada | H04L 9/0877 | 380/270 |
| 2011/0058672 A1* | 3/2011 | Sannino | H04L 9/3073 | 380/255 |
| 2011/0145897 A1* | 6/2011 | Tyree | G06F 21/42 | 726/6 |
| 2011/0222691 A1* | 9/2011 | Yamaguchi | G06F 21/10 | 380/278 |
| 2012/0321077 A1* | 12/2012 | Shiota | H04L 9/0866 | 380/44 |
| 2014/0043495 A1* | 2/2014 | Bateman | H04N 7/181 | 348/207.11 |
| 2014/0052993 A1* | 2/2014 | Isozaki | H04L 63/0428 | 713/175 |
| 2014/0122885 A1* | 5/2014 | Wu | H04L 29/06 | 713/171 |
| 2014/0355763 A1* | 12/2014 | Lee | G06F 13/10 | 380/282 |
| 2014/0359272 A1* | 12/2014 | Hiltunen | G09C 1/00 | 713/150 |
| 2015/0254436 A1* | 9/2015 | Lee | G06F 21/10 | 726/26 |
| 2015/0358158 A1* | 12/2015 | Fadaie | H04L 9/0838 | 713/171 |
| 2016/0019375 A1* | 1/2016 | Fasoli | G06F 21/10 | 726/30 |
| 2016/0048669 A1* | 2/2016 | Kim | G06K 9/00073 | 726/19 |
| 2016/0050067 A1* | 2/2016 | Merchan | H04L 9/0838 | 713/171 |
| 2016/0065370 A1* | 3/2016 | Le Saint | H04L 9/0841 | 713/155 |
| 2016/0066184 A1* | 3/2016 | Bhargav-Spantzel | G06F 21/40 | 726/7 |
| 2016/0094990 A1* | 3/2016 | Witherspoon | H04W 12/04 | 713/171 |
| 2016/0099922 A1* | 4/2016 | Dover | H04L 63/061 | 713/171 |
| 2016/0105400 A1* | 4/2016 | Straub | H04L 63/062 | 713/168 |
| 2016/0156467 A1* | 6/2016 | Seo | H04L 9/3236 | 713/171 |
| 2016/0182475 A1* | 6/2016 | Uzun | H04L 63/062 | 713/171 |
| 2016/0269176 A1* | 9/2016 | Pang | H04L 9/0841 | |
| 2017/0026174 A1* | 1/2017 | Pang | H04L 63/18 | |
| 2017/0155508 A1* | 6/2017 | Shiota | H04L 9/0866 | |
| 2017/0208045 A1* | 7/2017 | Huh | H04L 9/0822 | |
| 2017/0214668 A1* | 7/2017 | Mityagin | H04L 67/1095 | |
| 2017/0318616 A1* | 11/2017 | Yu | H04W 76/14 | |
| 2017/0324548 A1* | 11/2017 | Anshel | H04L 9/14 | |
| 2017/0374548 A1* | 12/2017 | Mason | H04W 8/245 | |
| 2018/0006810 A1* | 1/2018 | Ideguchi | H04L 9/08 | |
| 2018/0026787 A1* | 1/2018 | Le Saint | H04L 9/0841 | 713/155 |
| 2018/0047306 A1* | 2/2018 | Hiltunen | G09C 1/00 | |

* cited by examiner

TRANSACTION BASED MESSAGE SECURITY

FIELD

The subject matter disclosed herein relates to network security and more particularly relates to securing message transmission using transaction data.

BACKGROUND

Devices may establish secure communication links using various security schemes such as shared secrets, public-key cryptography, or the like. For example, a client may access a server by transmitting a predefined username and password to the server. Unauthorized third parties, however, may attempt to intercept or otherwise misappropriate security information, such as a username and password, to gain access to a device that they would normally not have access to.

BRIEF SUMMARY

An apparatus for transaction based message security is disclosed. A method and computer program product also perform the functions of the apparatus. An apparatus, in one embodiment, includes a processor and a memory that stores code executable by the processor. An apparatus, in one embodiment, includes code executable by a processor to determine a set of data that is common between a first device and a second device.

In a further embodiment, an apparatus includes code executable by a processor to generate, on a first device, a communication key based on a set of data. In some embodiments, an apparatus includes code executable by a processor to secure a message sent to a second device from a first device with a communication key.

An apparatus, in certain embodiments, includes code executable by a processor to generate a new communication key for every message sent from a first device to a second device. In a further embodiment, an apparatus includes code executable by a processor to generate a new communication key after expiration of a predetermined period of time since generation of an existing communication key.

In various embodiments, an apparatus includes code executable by a processor to hash a set of data to generate a communication key using a predetermined hash function. In one embodiment, an apparatus includes code executable by a processor to salt a hash function for generating the communication key using a salt value generated from the set of data. In some embodiments, an apparatus includes code executable by a processor to encrypt the message sent to the second device using the generated communication key.

In certain embodiments, an apparatus includes code executable by a processor to send a communication key to the second device with the message. In certain embodiments, an apparatus includes code executable by a processor to receive an access token from a second device in response to establishing a secure communication session with the second device. A message may be further secured using an access token.

In certain embodiments, an apparatus includes code executable by a processor to discard a communication key in response to sending a message to a second device. In some embodiments, a set of data includes a set of transactional data for a predetermined period of time. In some embodiments, a set of data includes transactional data received from a second device in one or more previously received messages. In various embodiments, a set of data comprises one or more of email data, financial data, social media data, background communications, heartbeat data, and device attributes.

A method, in one embodiment, includes determining, by a processor, a set of data that is common between a first device and a second device. In a further embodiment, a method includes generating, on a second device, a communication key based on a set of data. In some embodiments, a method includes accepting a message received at a second device from a first device in response to verifying that a communication key generated on the second device corresponds to a communication key used to secure the received message.

In one embodiment, a method includes determining whether a communication key generated on a second device matches a communication key received with the message from a first device. The message may be accepted in response to determining the communication keys match. In a further embodiment, a method includes decrypting a received message sent to a second device using a generated communication key. The message may be accepted in response to successfully decrypting the message.

A method, in a further embodiment, includes generating a new communication key after expiration of a predetermined period of time since generation of an existing communication key. In certain embodiments, a method includes hashing a set of data to generate a communication key using a predetermined hash function.

In some embodiments, a method includes ceasing communications between a first device and a second device in response to a communication key generated on the second device not matching a communication key used to secure the received message. In various embodiments, a method includes generating a notification in response to a communication key sent with a message not matching a communication key generated on a second device.

A program product, in one embodiment, includes a computer readable storage medium that stores code executable by a processor. In one embodiment, a program product includes code executable by a processor to perform determining a set of data that is common between a first device and a second device.

In a further embodiment, a program product includes code executable by a processor to perform generating, on a first device, a communication key based on a set of data. In some embodiments, a program product includes code executable by a processor to perform securing a message sent to a second device from a first device with a communication key.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
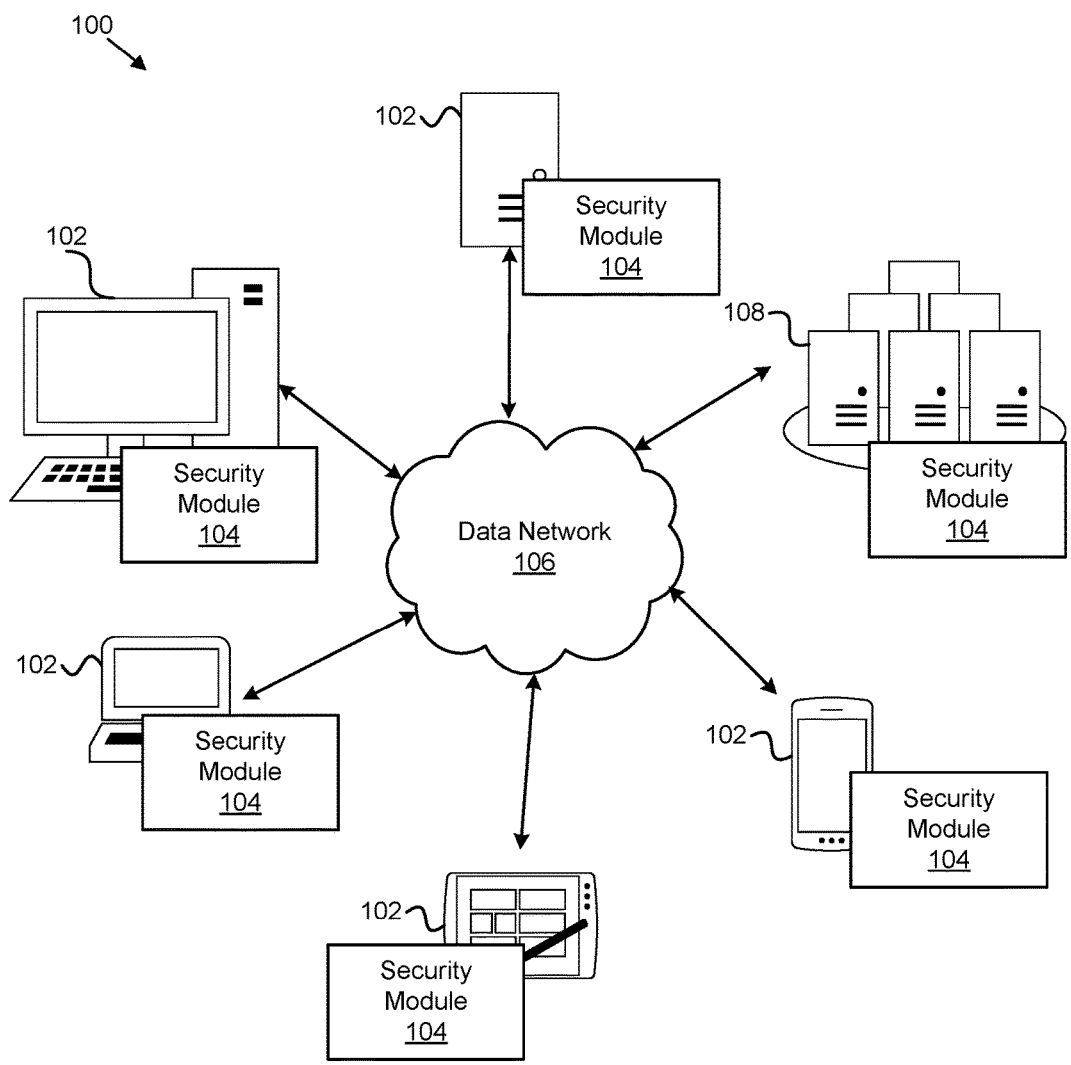
FIG. 1 is a schematic block diagram illustrating one embodiment of a system for transaction based message security.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for transaction based message security. In one embodiment, the system 100 includes one or more information handling devices 102, one or more security modules 104, one or more data networks 106, and one or more servers 108. In certain embodiments, even though a specific number of information handling devices 102, security modules 104, data networks 106, and servers 108 are depicted in FIG. 1, one of skill in the art will recognize, in light of this disclosure, that any number of information handling devices 102, security modules 104, data networks 106, and servers 108 may be included in the system 100.

In one embodiment, the system 100 includes one or more information handling devices 102. The information handling devices 102 may include a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, or another computing device including a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. As used herein, an information handling device 102 may also be known as a client device, a sender device, and/or the like.

In certain embodiments, the information handling devices 102 are communicatively coupleable to one another and/or to one or more servers 108 over a data network 106, described below. The information handling devices 102, in a further embodiment, are capable of executing various firmware, programs, program code, applications, instructions, functions, commands, shell scripts, cron jobs, and/or the like, and may access, store, download, upload, and/or the like data located on one or more servers 108. In some embodiments, the information handling devices 102 are configured to send and receive data, files, or the like, from one or more different information handling devices 102.

In one embodiment, the security module 104 is configured to determine a set of data that is common between a first device and a second device. The first and second devices may be client devices, servers 108, and/or a combination of both. As used herein, a client may be an information handling device 102, an application executing on an information handling device, and/or the like. Many of the examples and embodiments described herein are illustrated using communications between a client and a server 108; however, the communications may be between multiple client devices, multiple servers 108, and/or a combination of client devices and servers 108.

The security module 104, in a further embodiment, is configured to generate, on the first device, a communication key based on the set of data. In various embodiments, the security module 104 is configured to secure a message sent to the second device from the first device with the communication key. In one embodiment, the second device accepts the message in response to the communication key matching a corresponding communication key generated on the second device.

The security module 104, in one embodiment, improves the functioning of the computer and/or the computer technology in general, by adding an additional layer of security to network communications. In some existing network communication systems, a single layer of security may be provided using a private security token (e.g., an access token) that is requested, for example, by a client from a server 108, which may be used to secure subsequent communications with the server 108. Thus, if the private security token is not provided in messages sent to the server 108, the server 108 may not accept the message. Because only a single token is used to secure communications between a client and a server 108, if an unauthorized third party intercepts or otherwise misappropriates the private security token, the unauthorized third party may gain access to secure resources on the server 108.

The security module 104 improves the existing technology by adding an additional layer of security by generating a communication key that is used to secure messages along with the private security token. The communication key, in some embodiments, is generated using data received from previous communications with a server 108 such that the data is unique and common to both the client and the server 108, and a new communication key may be generated for each message sent from the client to the server 108. Thus, even if the private security token is intercepted, if an unauthorized third party cannot generate a communication key that matches a communication key generated by the server 108, the unauthorized third party will not be granted access to the server 108.

The security module 104, a client, a server 108, and/or the like may access data and/or files stored on a different client or server 108 using one or more application programming interfaces ("API"). In some embodiments, the security module 104, a client, or a server 108 communicates securely with a client and/or server 108 by sending messages to the client or server's 108 API that are secured with a predefined secret, private key, access token, or the like. For example, a client may be an application that is requesting data from a resource server 108 on behalf of a user in an OAuth infrastructure (as used herein, OAuth is an open standard for authorization, commonly used as a way for Internet users to log in to third-party websites using their Microsoft®, Google®, Facebook®, Twitter®, etc. accounts without exposing their password). The security module 104 or client may include the access token in an authorization header included in any messages sent to the server 108 via the server's API so that the server 108 can verify that the client is authorized to access the user's account on the user's behalf.

In this manner, in one embodiment, the security module 104 provides means to prevent token misuse in an OAuth infrastructure. An inherent weakness of OAuth is that whichever entity is holding the access token, e.g., a client or a server 108, can access data on the device that issued the access token, e.g., a different client or server 108 that may not be authorized to access the device that issued the access token. The security module 104, in some embodiments, adds an additional layer of validation/security using a communication key, in addition to the access token, to verify that the access token is being used by a client or server 108 that was authorized to use the access token.

In various embodiments, the security module 104 may be embodied as a hardware appliance that can be installed or deployed on an information handling device 102, on a server 108, or elsewhere on the data network 106. In certain embodiments, a security module 104 may include a hardware device such as a secure hardware dongle or other hardware appliance device (e.g., a set-top box, a network appliance, or the like) that attaches to a device, a laptop computer, a server 108, a tablet computer, a smart phone, or the like, either by a wired connection (e.g., a USB connection) or a wireless connection (e.g., Bluetooth®, Wi-Fi®, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the security module 104 may include a power interface, a wired and/or wireless network interface, a graphical interface that attaches to a display, and/or a semiconductor integrated circuit device as described below, configured to perform the functions described herein with regard to the security module 104.

The security module 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the security module 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the security module 104.

The semiconductor integrated circuit device or other hardware appliance of the security module 104, in certain embodiments, includes and/or is communicatively coupled to one or more volatile memory media, which may include but is not limited to: random access memory ("RAM"), dynamic RAM ("DRAM"), cache, or the like. In one embodiment, the semiconductor integrated circuit device or other hardware appliance of the security module 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as a blade server, a mainframe server, a tower server, a rack server, and/or the like. The one or more servers 108 may be configured as a mail server, a web server, an application server, an FTP server, a media server, a data server, a file server, a virtual server, and/or the like. In certain embodiments, the one or more servers 108 store data in one or more databases, and/or files such as text documents, spreadsheets, portable document format ("PDF") files, emails, audio files, video files, source code, and/or the like. In some embodiments, the one or more servers 108 may be located on an organization's premises, in a data center, in the cloud, and/or the like. The one or more servers 108 may be accessed remotely over a data network 106 like the Internet, or locally over a data network 106 like an intranet.

Figure 2:
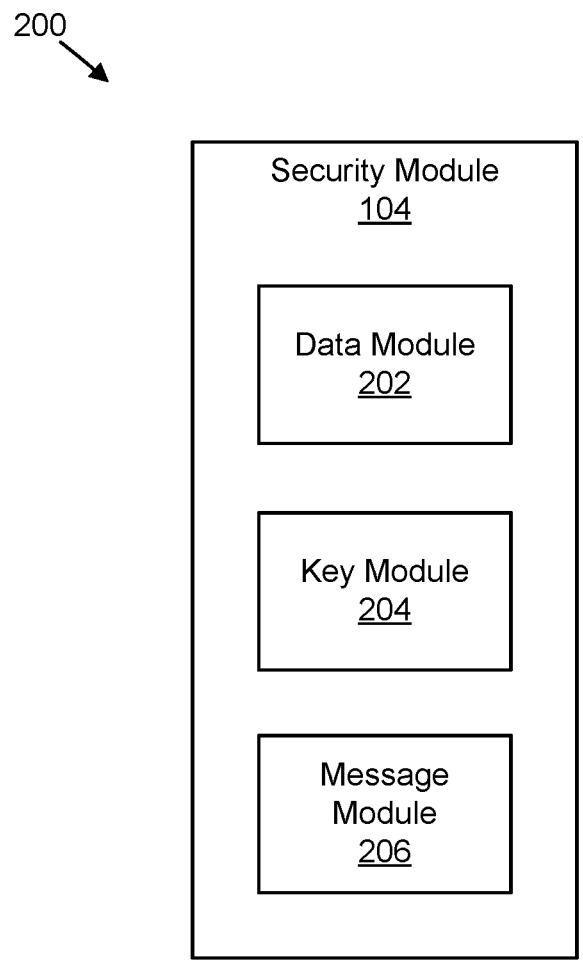
FIG. 2 is a schematic block diagram illustrating one embodiment of an apparatus for transaction based message security.

FIG. 2 depicts one embodiment of an apparatus 200 for transaction based message security. The apparatus 200 may include an embodiment of a security module 104. In one embodiment, the security module 104 includes one or more of a data module 202, a key module 204, and a message module 206, which are described in more detail below.

The data module 202, in one embodiment, is configured to determine a set of data that is common between a first device and a second device, e.g., between a client and a server 108. As used herein, data may include various types of data such as messages, records, or the like, that are stored on a device, e.g., a server 108, and/or accessible by a server 108, a client, or the like, and accessible by a different device communicatively connected to the device where the data is stored. The data may be data that is associated with an event, a transaction, an occurrence, and/or the like, and may be associated with a timestamp. Examples of data may include email data, text message data, instant message data, financial data, social media data, image data, sales data, credit card data, travel data, storage data, delivery data, order data, payment data, heartbeat data (e.g., a periodic signal generated by hardware or software to indicate normal operation, to synchronize other parts of a system, or the like), background communication data (e.g. synchronization data, push notification data, geo-location data, or the like), machine-specific attribute data (e.g., hardware specifications, serial numbers, model numbers, or the like), and/or the like.

For example, a server 108 may be an email server that stores emails for a user's email account. A client may be an email client application that requests and presents the user's email to the user on the user's device. The client may request the email data from the email server 108 by sending messages to the email server 108 using an API for the email server 108. In such an embodiment, at least a portion of the email data may be common to both the client and the server 108 because the client may receive and/or store email data that is stored on the server 108. In other words, because the client received email data from the server 108, the client and the server 108 may both have copies of the same email data. Other embodiments may include a client requesting credit card transaction data using an API of a financial server 108, a client requesting order data using an API of an online retailer's server 108, and/or the like.

In one embodiment, the data module 202 determines a set of data by selecting data from a predefined period of time or by selecting a predefined number of recently received data. For example, the data module 202 may select all email messages received from a server 108 for the previous 30 minutes. In another example, the data module 202 may select the previous five email messages received from the server 108. In this manner, both the client and the server 108 may have the same set of transactional data that can be used to generate the communication key. Furthermore, because the data module 202 selects the data based on a predefined time period and/or a predefined number of recently received messages, the generated communication key may be created based on different data, which allows a new key to be created on a rolling basis in an attempt to thwart misuse of a communication key if it is intercepted or otherwise misappropriated.

The key module 204, in one embodiment, is configured to generate a communication key based on a set of data. In one embodiment, the key module 204 takes the common data selected by the data module 202 and generates a communication key. As used herein, a communication key may be a character string, a number, a combination of numbers and characters, and/or the like. The communication key, in one embodiment, is associated with a client (e.g., the client may be identified by an access token, described below). The communication key may be a unique key, in one embodiment. In another embodiment, the communication key may not be unique, but may be paired with another identifier associated with the client (e.g., the access token), which uniquely associates the communication key with the client.

In one embodiment, the key module 204 creates the communication key on both devices that are in communication with each other, e.g., a client and a server 108. In this manner, for example, when a client sends a message to a server 108, and secures the message with the communication key, the key module 204 can determine whether the key created and sent by the client, using data on the client, matches the key created by the server 108 using data on the server 108.

In one embodiment, the key module 204 generates the communication key by using the selected set of data as input into a predefined hash function. In such an embodiment, the key module 204 uses the same hash function on each of the devices that are in communication such that the same communication key is created if the same set of data is selected and used on each of the devices. For example, the data module 202 may select the timestamps of five most recent credit card transactions as a set of transactional data to be used as input to a hash function. A server 108 may have sent the credit card information to a client in one or more previous communications in response to one or more client requests such that the credit card information is available on the client and the server 108. Accordingly, the communication key may be the resulting hash value generated by the hash function.

In certain embodiments, the key module 204 hashes various parts, components, elements, content, or the like of the data. For example, the key module 204 may select various parts of email transactional data to hash such as senders, recipients, subjects, bodies, timestamps, and/or the like. The key module 204, in another example, may select various parts of social media content to hash such as friends, wall posts, images, links, and/or the like. Thus, the key module 204 can select various parts of the selected set of data to generate a unique communication key that may be difficult for an unauthorized third party to recreate due to the user-specific nature of the data.

In some embodiments, the key module 204 "salts" a hash function used to generate a communication key by using a hash value generated from the common set of data. As used herein, a "salt" may be data that is used as an additional input to a hash function. For example, the key module 204 may generate a hash value of the previous five email messages that are common between a device that is sending a message and a receiving device. The key module 204 may generate a communication key by using the generated hash value to "salt" a hash function that is used to generate a hash value of a token (e.g., an access token), the message content, an identifier for the sender, an identifier for the recipient, or the like, and/or any combination of the foregoing. On the receiving device, as described below, the key module 204 separately or independently generates a hash value using the same set of common data to "salt" the same hash function that is used to generate a hash value of the same data that was used to generate the communication key, e.g., the token, the message content, or the like.

In some embodiments, the key module 204 assigns an expiration indicator such as an expiration date, time, period, or the like to the communication key such that the communication key can be invalidated when it expires. For example, the key module 204 may assign a particular expiration date to the communication key, such as Sep. 1, 2016. In another example, the key module 204 assigns a particular period of time to the communication key that specifies how long the key is valid for, such as one minute, one hour, one day, one week, or the like. In certain embodiments, the expiration indicator is sent with, stored with, or otherwise associated with the communication key so that a client and/or a server 108 can verify whether the communication key has expired.

In a further example, the key module 204 specifies how many messages the communication key is valid for, such as one message (which would require the key module 204 to generate a new communication key for each message), five messages, ten messages, or the like. In such an embodiment, a device may track how many messages the communication key has been sent with. For example, a client or a server 108 may track how many times a communication key has been sent with a message to a different client or server 108.

In one embodiment, the key module 204 generates a new communication key in response to the communication key expiring. In another embodiment, the key module 204 generates a new communication key for every message, transaction, or the like that is sent from one device to another device, e.g., from the client to the server 108. In such an embodiment, the key module 204 may discard an existing communication key after it is used to secure a message sent to a device to prevent a misappropriated communication key from being used by an attacker. In these embodiments, the data module 202 may select a new set of data that is different than the set of data that the key module 204 used to generate a previous communication key, such as, for example, a set of transactional data that includes recent messages received from a server 108, and that is also common between a client and a server 108, and the key module 204 may generate a new communication key based on the new transactional data.

The message module 206, in one embodiment, is configured to secure a message sent to a device from another device with the communication key that the key module 204 generated. In certain embodiments, the message module 206 sends the communication key with the message to be presented to a device that receives the message. After the device receives the message, the key module 204 may compare the received communication key with a communication key generated on the receiving device to verify that the message was sent by an authorized device, such as an authorized client that sends messages to a server 108. For example, the key module 204 may generate a communication key on a server 108 using the same transactional data that a client used to generate the received communication key to verify that the communication keys match.

In some embodiments, the message module 206 encrypts the message with the communication key on the sending device, and the key module 204 may attempt to decrypt the message on the receiving device using a communication key generated on the receiving device. In one embodiment, if the key module 204 successfully decrypts the message, the key module 204 can verify that the communication keys generated on the sending and receiving devices match.

If the key module 204 determines that the received communication key matches a communication key generated on the receiving device, the message module 206 may accept the message, satisfy a request that the message contains, and/or the like. For example, the message may include a request for transactional data that is accessible to the server 108 (e.g., stored on the server 108, accessed by the server 108 to send to the client, or the like), such as email data, social media data, financial data, or the like. If the key module 204 determines that the received communication key does not match the generated communication key on a receiving device, the message module 206 may reject the message, described below with reference to the reaction module 304. If the key module 204 determines that the received communication key and the communication key generated on the receiving device do not match, this may indicate that an unauthorized third party has intercepted an access token and a previously used communication key and is attempting to gain access to the device that received the message, such as a server 108.

In some embodiments, for example, when the message module 206 sends a message from a client to a server 108, the message module 206 may use one or more API functions, calls, or the like, that the server 108 provides to send the message, the communication key, and/or other information (such as an access token). For example, a Facebook® server may provide an API for a client to use to request a user's social media data, such as a user's friend list, wall posts, uploaded images, and/or the like.

In one embodiment, the message module 206 encrypts a message being sent with the communication key that the key module 204 generates. In such an embodiment, the message module 206 does not send the communication key that the key module 204 generates with the message, but instead encrypts the message with the communication key. On the receiving device, the message module 206 may decrypt the message with a communication key that the key module 204 generates on the device that receives the message. Failure to decrypt the message with the communication key generated on the receiving device may indicate that the message was not sent by an authorized sender. In this manner, because the communication key is not transmitted with the message, the risk of an unauthorized entity intercepting or otherwise misappropriating the communication key is prevented.

Figure 3:
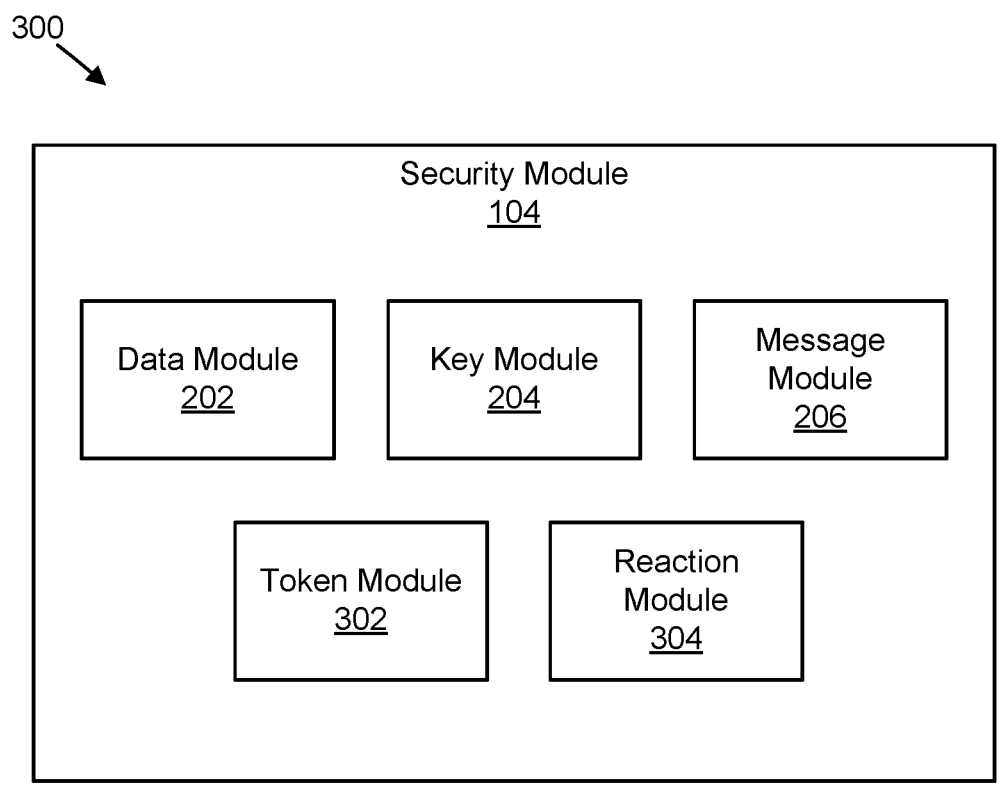
FIG. 3 is a schematic block diagram illustrating one embodiment of another apparatus for transaction based message security.

FIG. 3 depicts one embodiment of an apparatus 300 for transaction based message security. The apparatus 300 may include an embodiment of a security module 104. In one embodiment, the security module 104 includes one or more of a data module 202, a key module 204, and a message module 206, which may be substantially similar to the data module 202, the key module 204, and the message module 206 described above with reference to FIG. 2. The security module 104, in a further embodiment, includes one or more of a token module 302 and a reaction module 304, which are described in more detail below.

The token module 302, in one embodiment, is configured to receive an access token from a first device, e.g., a server 108 in response to a second device, e.g., a client device, establishing a secure communication session with the second device. As used herein, an access token is a verification token provided by a first device, e.g., a server 108, that is being accessed by a second device (e.g., an authorized third party client or server 108) in response to an owner of a resource on the first device granting the second device access to the resource on the first device.

For example, Instagram® may request to post images on a user's Facebook® wall. The Instagram® user may tell Facebook® that Instagram® is allowed to post images on the user's Facebook® wall, and the Facebook® server may generate and issue Instagram® an access token that identifies Instagram® as an authorized client that has access to the user's Facebook® account, and also sets the boundaries of Instagram's® access (e.g., such as limiting Instagram's® access to only posting images, and not access to the user's friend list, etc.). This may be done, for example, using an OAuth infrastructure. Any future communications from Instagram® to Facebook® may need to include the access token so that Facebook® can verify the identity of the message sender.

However, an unauthorized third party may intercept or otherwise misappropriate the access token, and send messages, data requests, etc., to the Facebook® server to access the user's account and data. Thus, to prevent unauthorized access to the user's account on the Facebook® server, the message module 206 secures the message with the communication key, in addition to the access token, to provide a second layer of security. In this manner, even if an unauthorized third party intercepts the access token, the unauthorized third party would need to generate the communication key using data that the unauthorized third party and the intended server 108 have in common.

The reaction module 304, in one embodiment, is configured to perform a security action in response to determining that a communication key received at a second device, e.g., a server 108, does not match a communication key generated at a first device, e.g., a client, and sent to the second device from the first device. Determining that the received communication key does not match a communication key generated at the receiving device may indicate that an unauthorized third party, such as an unauthorized third party in a man-in-the-middle attack, has misappropriated, intercepted, or otherwise gained access to the access token and is attempting to appear as a device authorized to access to a device that issued the access token.

In one embodiment, the reaction module 304 generates a notification in response to the communication key sent with the message not matching the communication key generated on the receiving device. The reaction module 304, for example, may notify a user of a client or server 108 that the received communication key did not match the communication key generated on the receiving server 108. The notification may include information identifying the sender of the message, such as an IP address, a MAC address, or other identifying information.

In a further embodiment, the reaction module 304 ceases communications between devices, such as between a client and a server 108, in response to determining that the communication key sent with the message does not match a communication key generated on the receiving device. In such an embodiment, the key module 204 on the sending device generates a new communication key, based on data that the receiving device and the sending device have in common, and restarts communications with the receiving device using the new communication key in response to re-authenticating or re-establishing a secure communication session with the receiving device by requesting a new access token, using two-factor authentication, or the like. In this manner, the security module 104 can detect that the communication key has been misappropriated, by a man-in-the-middle attack, for example, and can continue communications between the receiving device and sending device by changing the communication key to circumvent the attacker.

Figure 4:
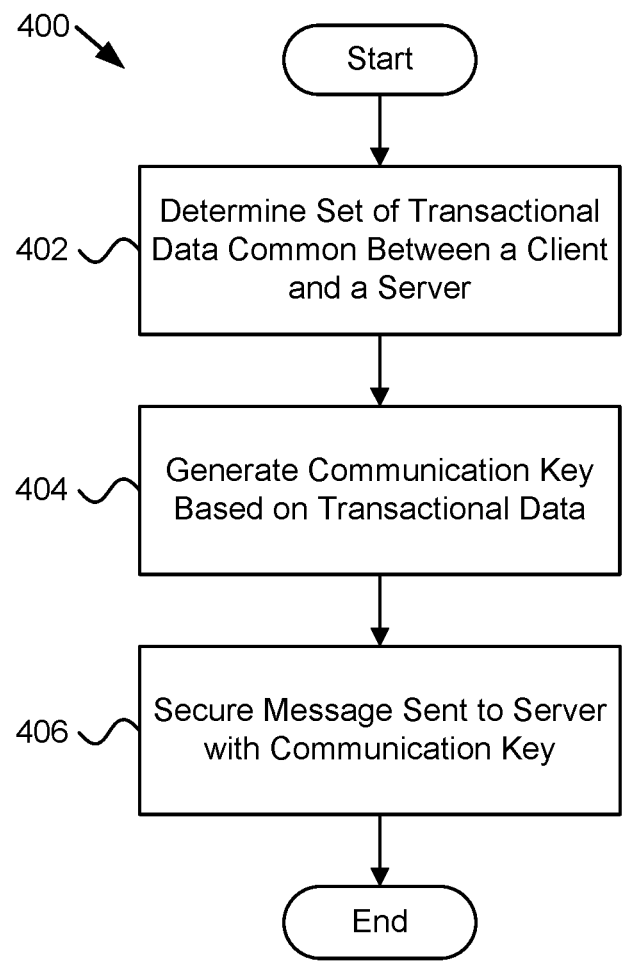
FIG. 4 is a schematic flow chart diagram illustrating one embodiment of a method for transaction based message security.

FIG. 4 depicts a schematic flow chart diagram of one embodiment of a method 400 for transaction based message security. In one embodiment, the method 400 begins and the data module 202 determines 402 a set of data that is common between a first device and a second device, such as between a client and a server 108. In some embodiments, the key module 204 generates 404 a communication key on the first device based on the data. In a further embodiment, the message module 206 secures 406 a message sent to a second device from the first device with the communication key. The message module 206 may send the communication key with the message, encrypt the message using the communication key, or the like. In certain embodiments, the second device accepts the message in response to the received communication key matching a corresponding communication key generated on the receiving second device, decrypting the message with the communication key generated on the receiving second device, or the like, and the method 400 ends.

Figure 5:
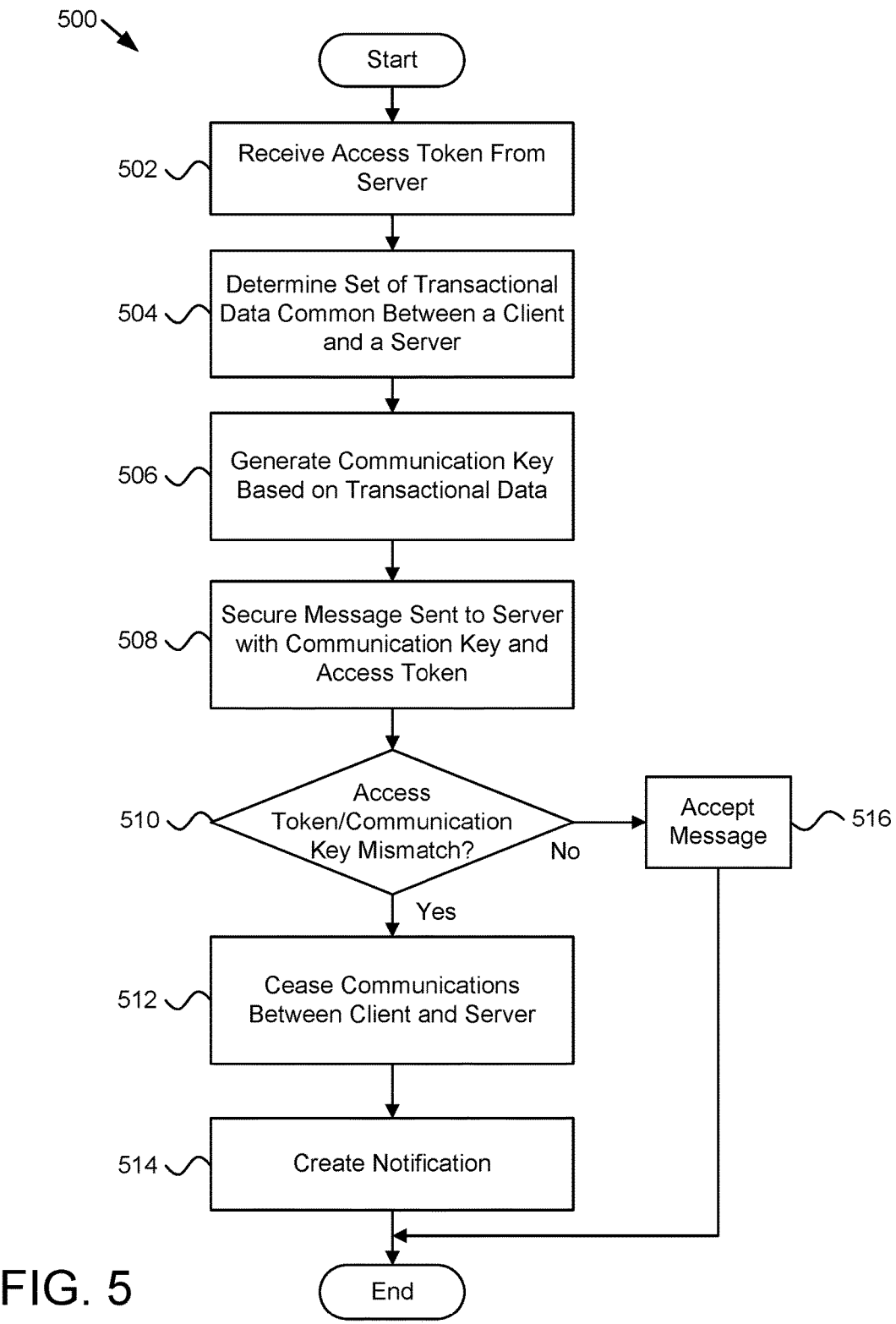
FIG. 5 is a schematic flow chart diagram illustrating one embodiment of another method for transaction based message security.

FIG. 5 depicts a schematic flow chart diagram of one embodiment of a method 500 for transaction based message security. In one embodiment, the method 500 begins, and the token module 302 receives 502 an access token from a second device, e.g., a server 108, in response to a request from a first device, e.g., a client, to establish a secure communication session. In a further embodiment, the data module 202 determines 504 a set of data that is common between a first device and a second device. The data may include data received from the second device in previous communications, such as the previous five email messages received from an email server 108, transaction data received from the second device for the previous ten minutes, or the like.

In one embodiment, the key module 204 generates 506 a communication key on the first device based on the data. The key module 204, for example, may generate 506 a hash value using header information from emails in a set of transactional data (e.g., using content in the subject header, the sender header, the recipient header, the body header, and/or the like). In various embodiments, the message module 206 secures 508 a message sent to the second device from the first device with the generated communication key and the access token by sending the communication key with the message, encrypting the message with the communication key, or the like.

The key module 204 may determine 510, at the second device, whether the access token and/or the communication key match an access token issued to the first device from the second device and/or a communication key generated on the second device using a set of data that mirrors the set of data on the first device. For example, the key module 204 may compare a communication key received with a message with a communication key generated on the second device to determine whether the communication keys match. In another example, the key module 204 may attempt to decrypt a message encrypted using a communication key generated on the first device using a communication key generated on the second device to determine whether the communication keys match.

If the key module 204 determines 510 that there is a mismatch, the reaction module 304, in one embodiment, ceases 512 communications between the first and second devices, e.g., between a client and a server 108. The reaction module 304, in some embodiments, creates 514 a notification that there was a mismatch with the sent access token and/or the communication key, and the method 500 ends. Otherwise, if the key module 204 determines that the received access token and communication key matches the issued access token and communication key generated on the second device, the second device accepts 516 the message, and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
determine a set of data that is common between a first device and a second device, the set of data comprising transactional data that is previously sent between the first device and the second device such that the first device and the second device each store a copy of the transactional data;
generate, on the first device, a communication key based on the set of data; and
secure a message sent to the second device from the first device with the communication key.

2. The apparatus of claim 1, further comprising code executable by the processor to generate a new communication key for every message sent from the first device to the second device.

3. The apparatus of claim 1, further comprising code executable by the processor to generate a new communication key after expiration of a predetermined period of time since generation of an existing communication key.

4. The apparatus of claim 1, further comprising code executable by the processor to hash the set of data to generate the communication key using a predetermined hash function.

5. The apparatus of claim 1, further comprising code executable by the processor to salt a hash function for generating the communication key using a salt value generated from the set of data.

6. The apparatus of claim 1, further comprising code executable by the processor to encrypt the message sent to the second device using the generated communication key.

7. The apparatus of claim 1, further comprising code executable by the processor to send the communication key to the second device with the message.

8. The apparatus of claim 1, further comprising code executable by the processor to receive an access token from the second device in response to establishing a secure communication session with the second device, wherein the message is further secured using the access token.

9. The apparatus of claim 1, further comprising code executable by the processor to discard the communication key in response to sending the message to the second device.

10. The apparatus of claim 1, wherein the transactional data comprises data for a predetermined period of time.

11. The apparatus of claim 1, wherein the transactional data is received from the second device in one or more previously received messages.

12. The apparatus of claim 1, wherein the set of data comprises one or more of email data, financial data, social media data, background communications, heartbeat data, and device attributes.

13. A method comprising:
determining, by a processor, a set of data that is common between a first device and a second device, the set of data comprising transactional data that is previously sent between the first device and the second device such that the first device and the second device each store a copy of the transactional data;
generating, on the second device, a communication key based on the set of data; and
accepting a message received at the second device from the first device in response to verifying that the communication key generated on the second device corresponds to a communication key used to secure the received message.

14. The method of claim 13, further comprising determining whether the communication key generated on the second device matches a communication key received with the message from the first device, wherein the message is accepted in response to determining the communication keys match.

15. The method of claim 13, further comprising decrypting the received message sent to the second device using the generated communication key, wherein the message is accepted in response to successfully decrypting the message.

16. The method of claim 13, further comprising generating a new communication key after expiration of a predetermined period of time since generation of an existing communication key.

17. The method of claim 13, further comprising hashing the set of data to generate the communication key using a predetermined hash function.

18. The method of claim 13, further comprising ceasing communications between the first device and the second device in response to the communication key generated on the second device not matching the communication key used to secure the received message.

19. The method of claim 13, further comprising generating a notification in response to the communication key sent with the message not matching the communication key generated on the second device.

20. A program product comprising a computer readable storage medium that stores code executable by a processor, the executable code comprising code to perform:
determining a set of data that is common between a first device and a second device, the set of data comprising transactional data that is previously sent between the first device and the second device such that the first device and the second device each store a copy of the transactional data;
generating, on the first device, a communication key based on the set of data; and
securing a message sent to the second device from the first device with the communication key.

* * * * *